UNITED STATES PATENT OFFICE.

FRIEDRICH RUPPERT, OF MAINZ-MOMBACH, GERMANY, ASSIGNOR TO VEREIN FÜR CHEMISCHE INDUSTRIE IN MAINZ, OF FRANKFORT-ON-THE-MAIN, GERMANY.

CELLULOSE ACETATE AND A PROCESS OF MAKING SAME.

1,263,119. Specification of Letters Patent. Patented Apr. 16, 1918.

No Drawing. Application filed November 13, 1914. Serial No. 872,004.

*To all whom it may concern:*

Be it known that I, Dr. FRIEDRICH RUPPERT, a subject of the King of Prussia, and resident of Mainz-Mombach, Arndtstrasse 44, Germany, have invented a new Cellulose Acetate and a Process of Making Same, of which the following is a full, clear, and exact specification.

Hitherto the preparation of cellulose acetates was obtained by the action of acetic anhydrid, acetic acid and catalyzators on cellulose till solution took place. It was admitted that the formation of a solution was a test of the achievement of the esterification and was necessary to render the formed acetate accessible to the subsequent treatment either by converting the acetate by precipitation into a dry state or by bringing previously the acetate in other forms of solubility by a subsequent treatment. Namely for this last process the existence of a perfect solution is an indispensable condition. For instance, merely soaked masses cannot be converted into acetates of high degrees of solubility, which possess the property of a uniform solubility and give solutions of a high viscosity.

The present invention is based on the new observation that a perfect esterification can be attained without liquefaction and that furthermore the liquefaction is a noxious event, which has nothing to do with the esterification, but is due to the attack of the cellulose molecule that is to say to a secondary event, which should be avoided.

The invention brings also the new knowledge that by avoiding the liquefaction and the herewith connected attack of the cellulose molecule, acetates of such a prominent quality may be prepared as were hitherto not attainable. This quality is evidenced by a viscosity of the acetate solutions hitherto not obtained and by a toughness and fastness of the films, lacquers and artificial silks made of the acetate solutions, so that without addition of camphor or of its surrogates films may be prepared with the acetates, which are able to satisfy the highest requisites.

It is true that earlier acetates have been prepared without dissolution. This result was obtained by adding to the acetylating mixture such substances as for instance benzene, which prevent the dissolution of the formed acetates. But these latter were soluble in acetic acid, that is to say the reactions producing the liquefaction in pure acetic solutions were employed, while such reactions are avoided in the process of the present invention.

I have found, that with the aid of weak acting catalyzators, as for instance sulfuryl chlorid, or phosphorus pentachlorid, or of mixture of such catalyzators, entirely acetylated celluloses may be obtained which are distinguished from the cellulose acetates prepared according to known processes by a hitherto not attained viscosity of their solutions and by other properties of solubility, if the acetylation is effected at temperatures below 20° C. After complete acetylation the reaction products obtained form unliquefied, very elastic jellies which cannot be dissolved in a large excess of cold glacial acetic acid.

All cellulose triacetates or substituted cellulose triacetates, as for instance cellulose sulfoacetates, known hitherto, are described as substances soluble in glacial acetic acid and are transformed in pure solutions of glacial acetic acid into products of other forms of solubility. These processes cannot be employed with the esters herein described, these latter dissolving even by heating only very incompletely and with decomposition.

The new cellulose acetates can be made practically useful, by dissolving the firm jellies in convenient solvents, as for instance phenols, cresols, chlorinated hydrocarbons and transforming the ester solutions according to known processes to other degrees of solubility either by the aid of hydrolyzing agents or without such agents at a higher temperature.

The process being achieved, the products can be precipitated in known manner and delivered from the adherent acid substances. The products obtained show after drying of their solutions a toughness surpassing largely that of the trade cellulose acetates.

In the same manner the celluloses which have been subjected to a precautious nitration, can be transformed into mixed esters of high viscosity.

Example I: Over 50 parts of cellulose or of weakly nitrated cellulose is poured a mixture of 200 parts of acetic anhydrid, 200 parts of glacial acetic acid and 1 to 2 parts of sulfuryl chlorid, cooled down at 10° C., by little portions, care being taken that the temperature rises not over 20° C. The reaction is accomplished as soon as an unliquefied, very elastic jelly is formed, which dissolves easily to a viscous solution, after it has been mixed intimately with an equal weight of tetrachlorethane. In order to convert it to other degrees of solubility, its complete solution is produced for instance by addition of 450 parts of tetrachlorethane, care being taken to avoid a rise of temperature and the so obtained solution is subjected to one of the known processes for instance by dissolving as much crystallized sodium acetate in 60 parts of acetic acid of 70% as necessary to neutralize the sulfurylchlorid and by heating the mixture to 100° C. till the desired solubility is attained.

Example II: Over 50 parts of weakly or feebly nitrated cellulose are poured slowly as above a cooled mixture of 200 parts of acetic anhyhrid, 200 parts of glacial acetic acid, 1 part of phosphorus pentachlorid, care being taken to prevent the temperature from rising over 20° C. and the process is achieved as in Example I.

What I claim is:

1. The described process for the manufacture of cellulose acetates consisting in acting on celluloses with acetic anhydrid in presence of a metalloid chlorid acting as a catalyzator, at temperatures below 20° C., but without addition of a diluent agent avoiding the dissolution, and interrupting the reaction as soon as the reaction mixture forms an unliquefied very elastic jelly soluble in tetrachlorethane, but insoluble in cold glacial acetic acid.

2. The described process for the manufacture of cellulose acetates by acting on cellulose with acetic anhydrid and acetic acid at temperatures below 20° C. in presence of a metalloid chlorid acting as a catalyzator, but without addition of a diluent agent avoiding the dissolution, and interrupting the reaction as soon as the reaction mixture forms an unliquefied very elastic jelly soluble in tetrachlorethane, but insoluble in cold glacial acetic acid.

3. As new articles of manufacture, the described products consisting of cellulose acetates and other reaction products formed by the action of glacial acetic acid, acetic anhydrid and metalloid chlorid upon cellulose, yielding very viscous solutions and being unliquefied, very elastic jellies soluble in tetrachlorethane, but insoluble in a large excess of cold glacial acetic acid.

In witness whereof I have hereunto signed my name this 24th day of October, 1914, in the presence of two subscribing witnesses.

Dr. FRIEDRICH RUPPERT.

Witnesses:
JEAN GRUND,
CARL GRUND.